July 14, 1936.  A. F. BELL  2,047,305

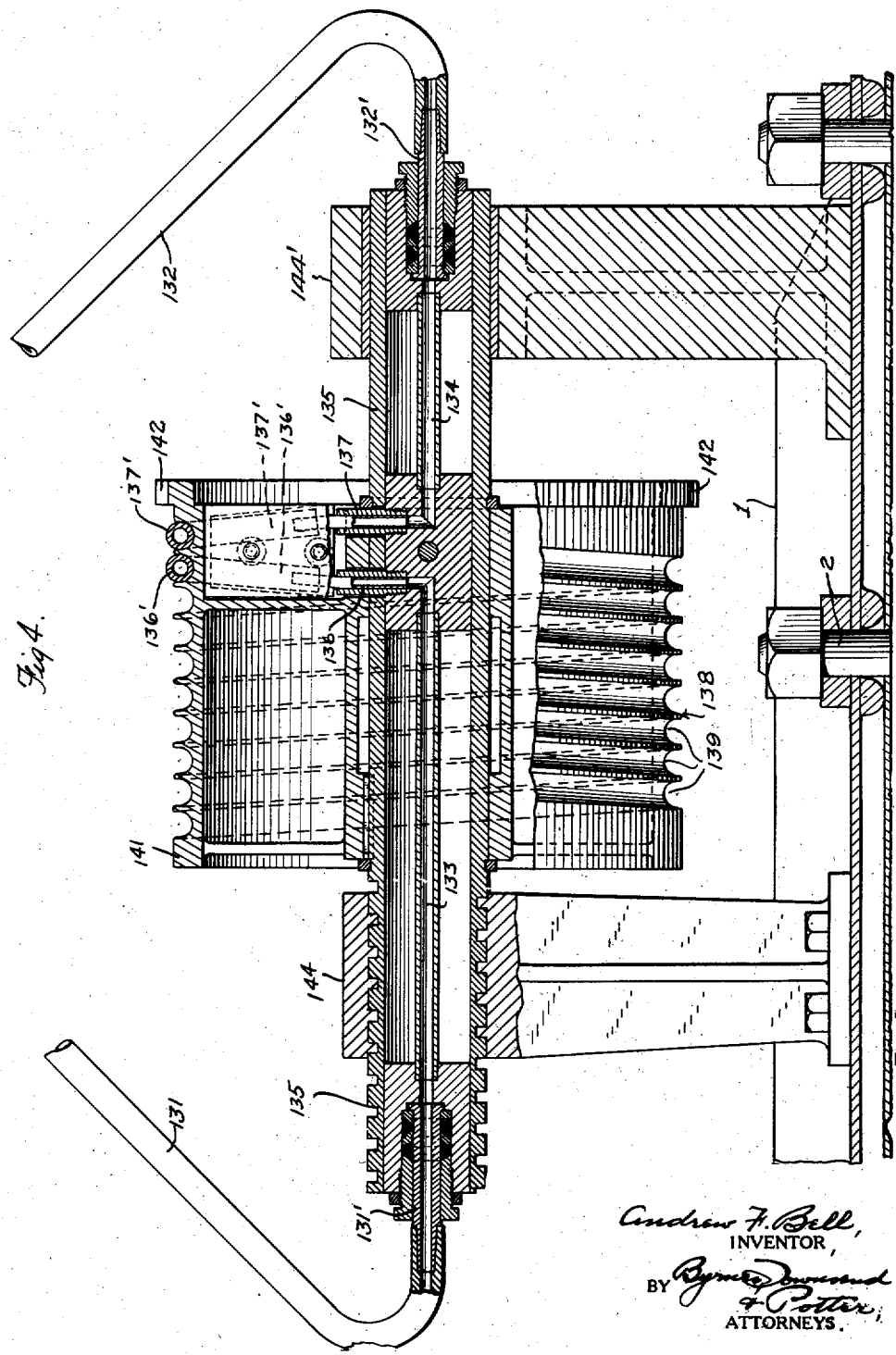

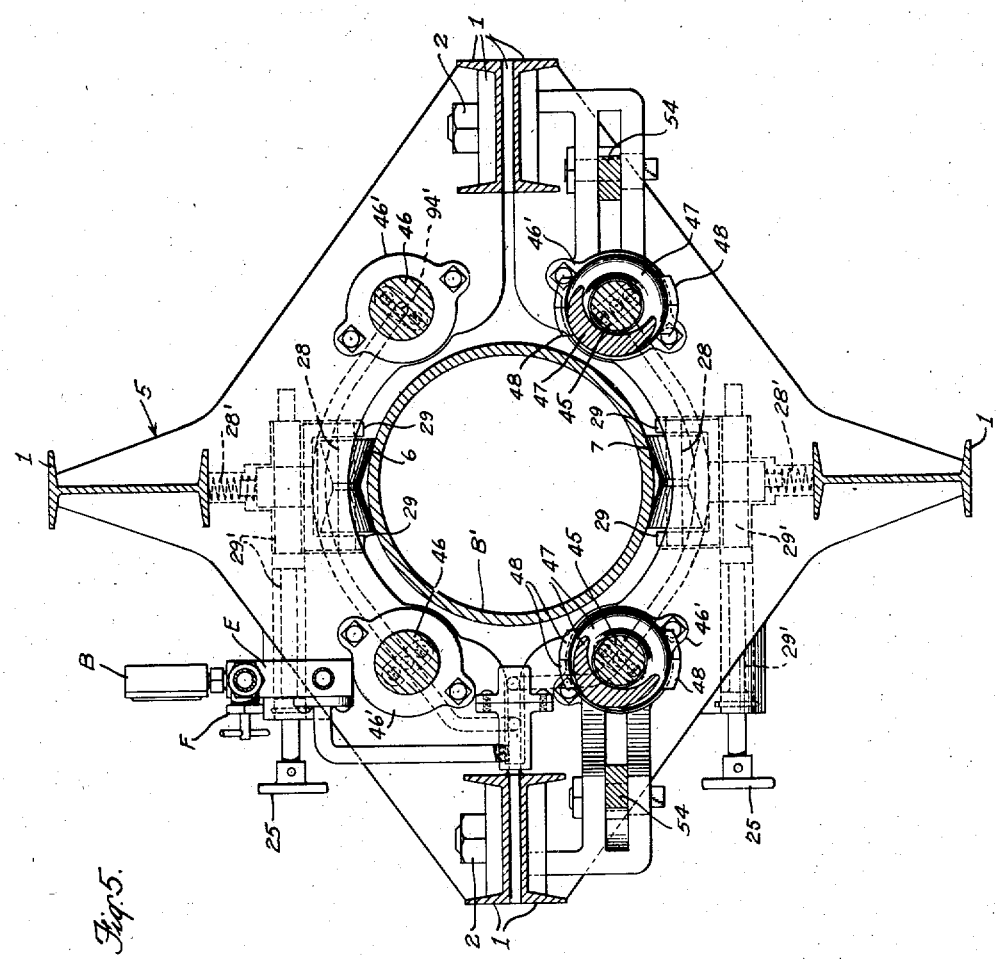

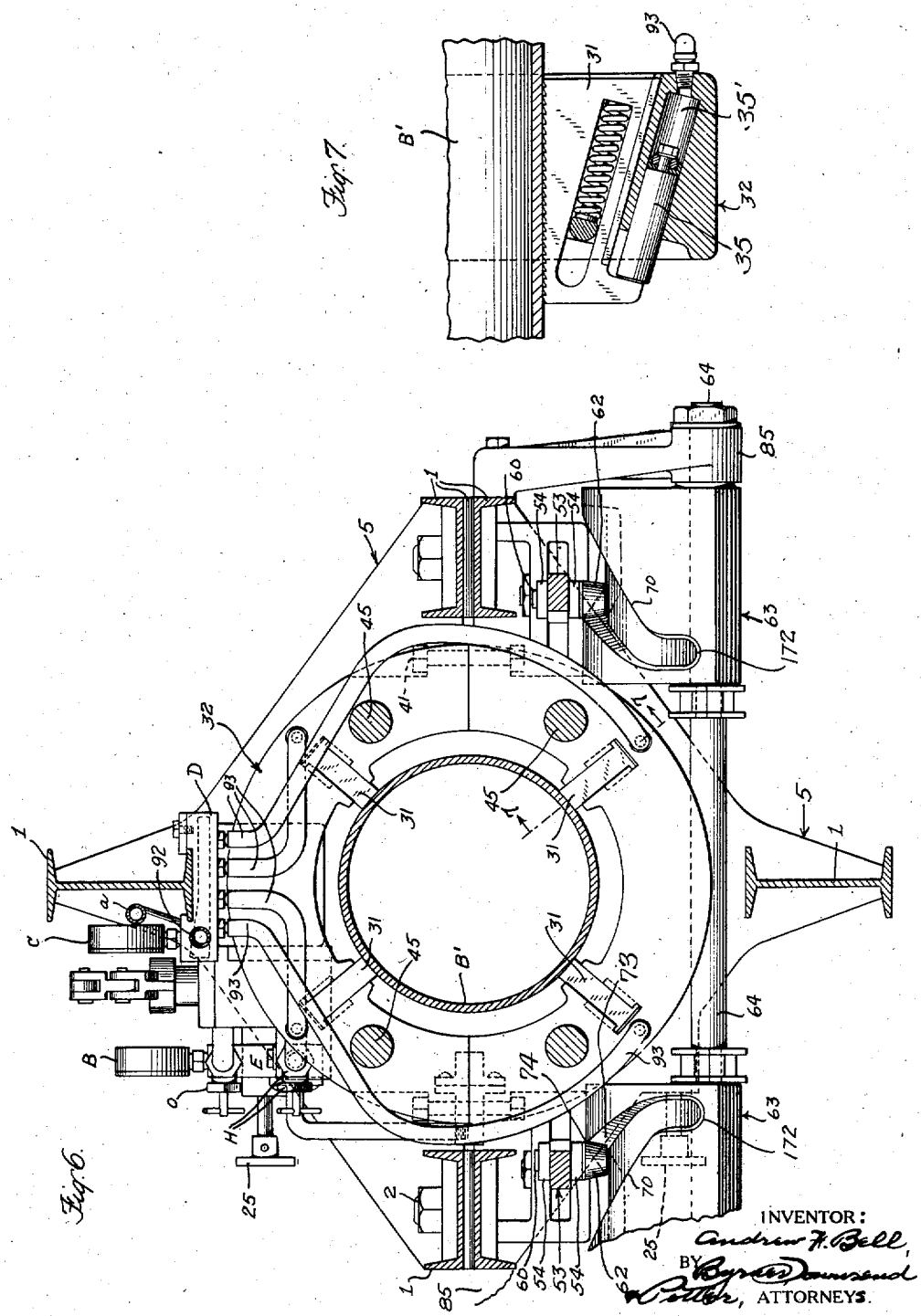

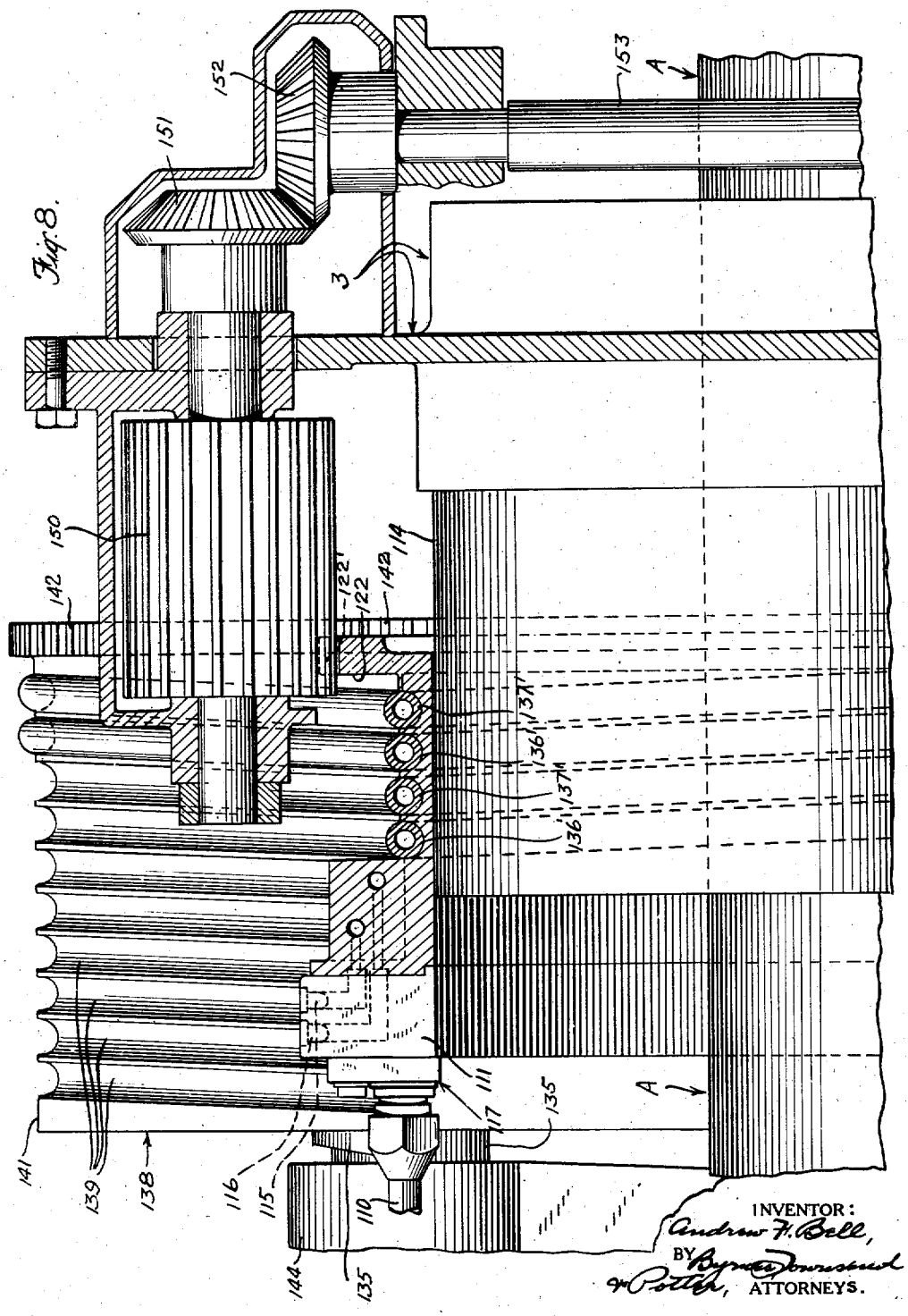

WELDING MACHINE

Filed June 30, 1930  13 Sheets-Sheet 8

Andrew F. Bell,
INVENTOR,
BY Byrnes Townsend
& Potter,
ATTORNEYS.

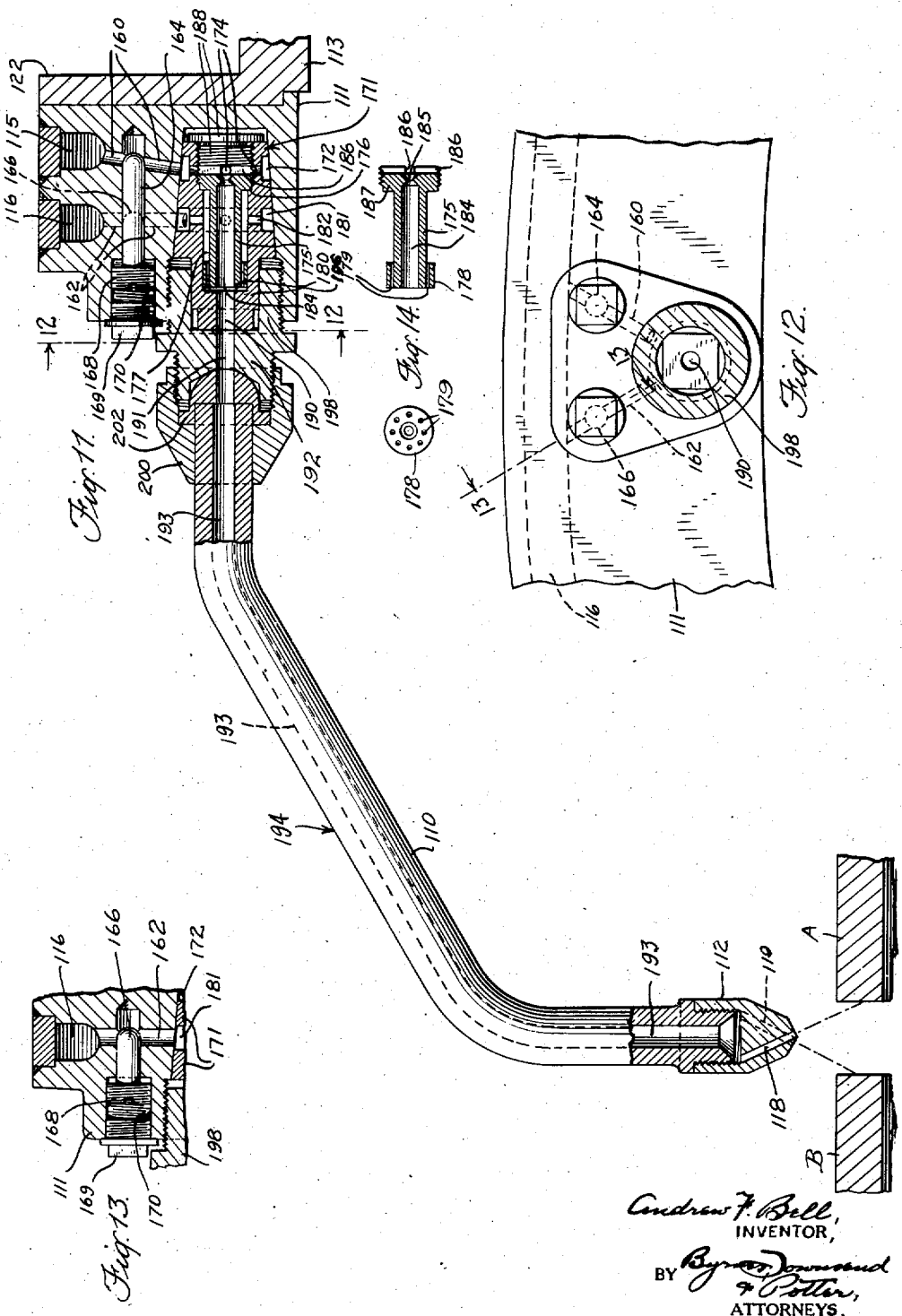

July 14, 1936.  A. F. BELL  2,047,305
WELDING MACHINE
Filed June 30, 1930   13 Sheets-Sheet 10

July 14, 1936.                    A. F. BELL                    2,047,305
                              WELDING MACHINE
                    Filed June 30, 1930          13 Sheets-Sheet 11
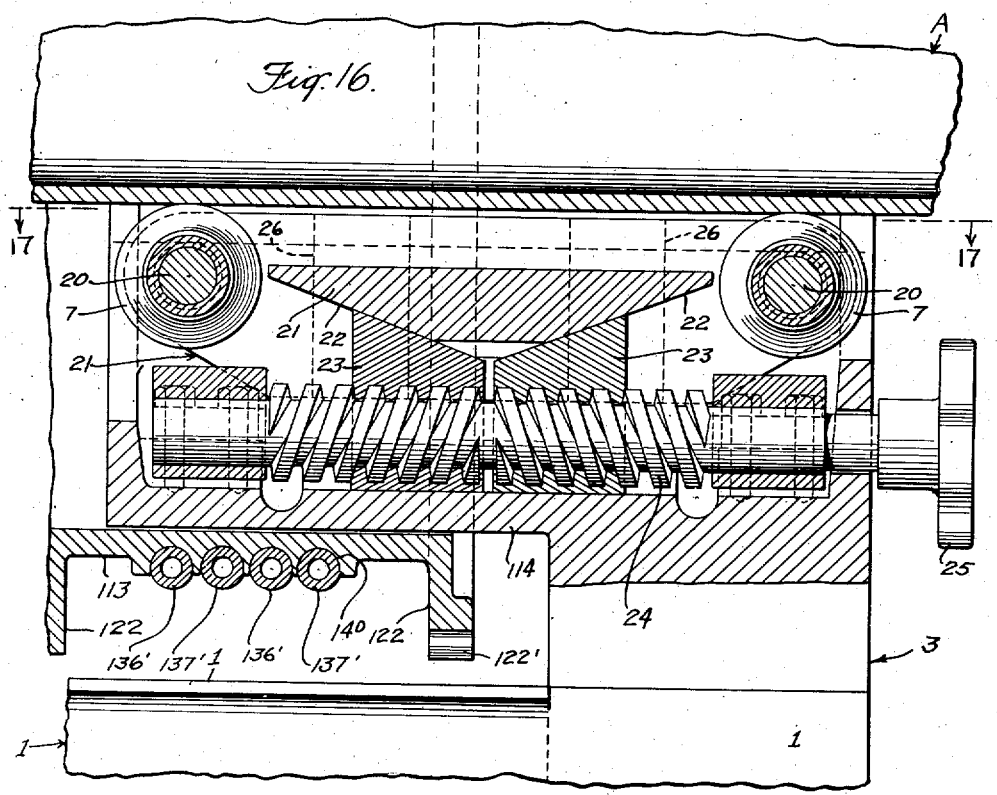
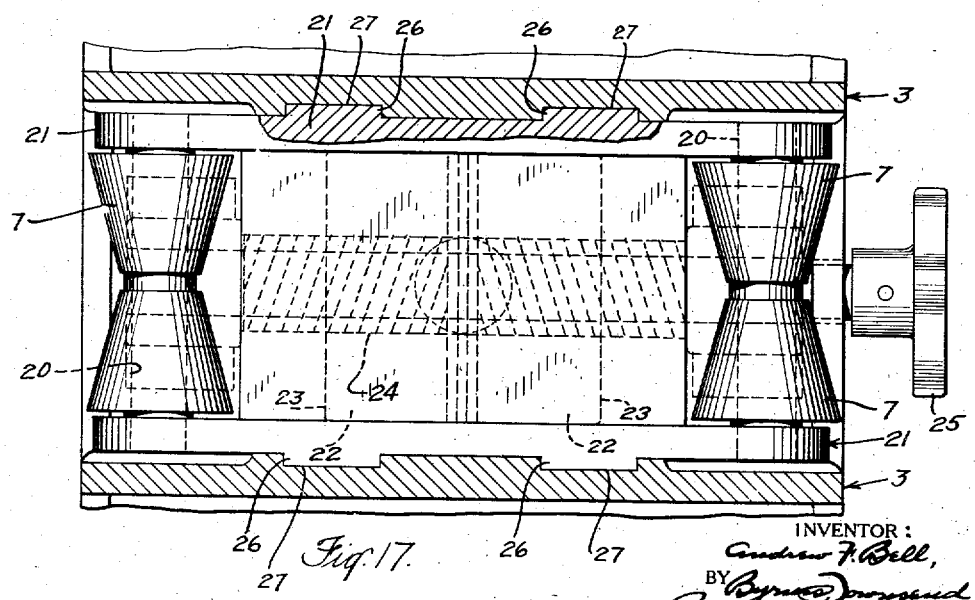

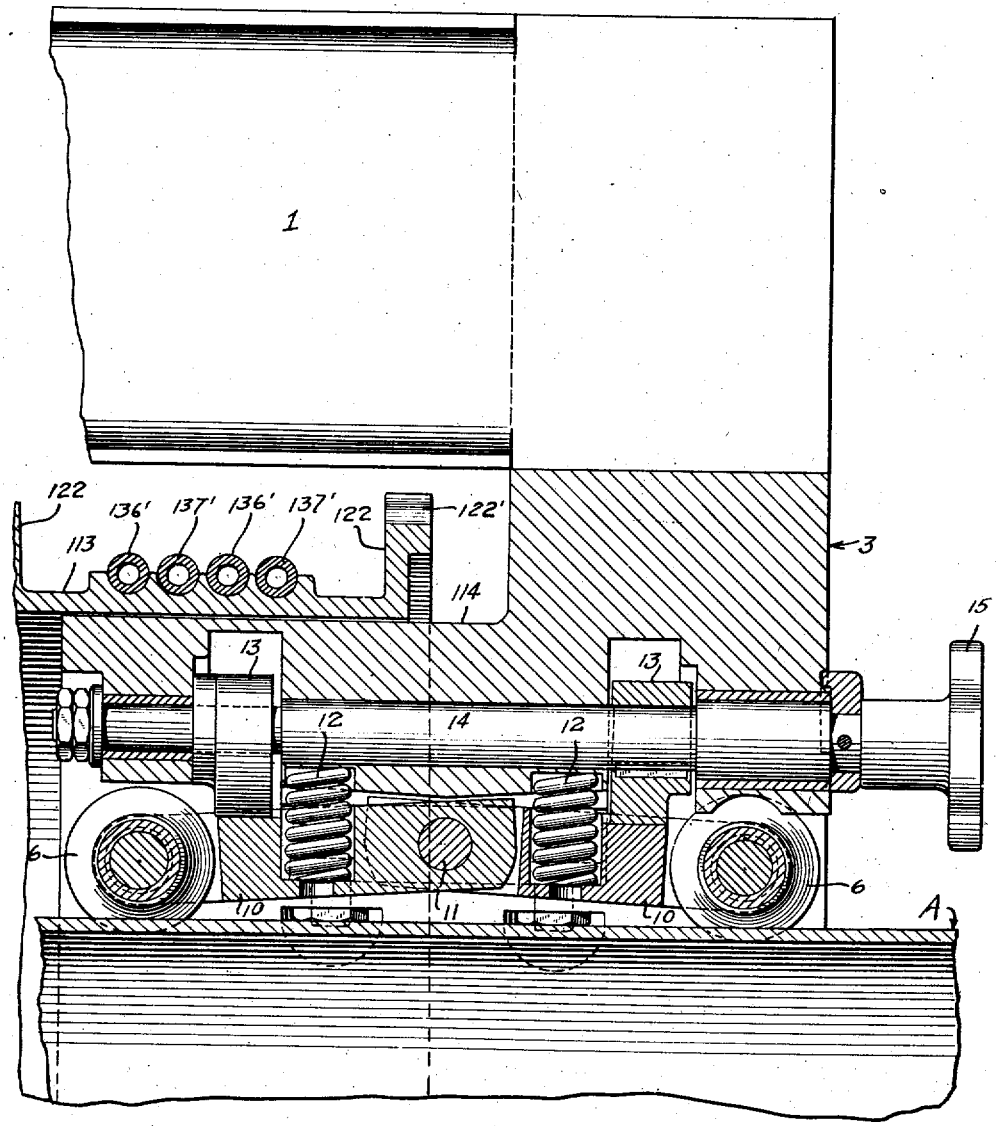

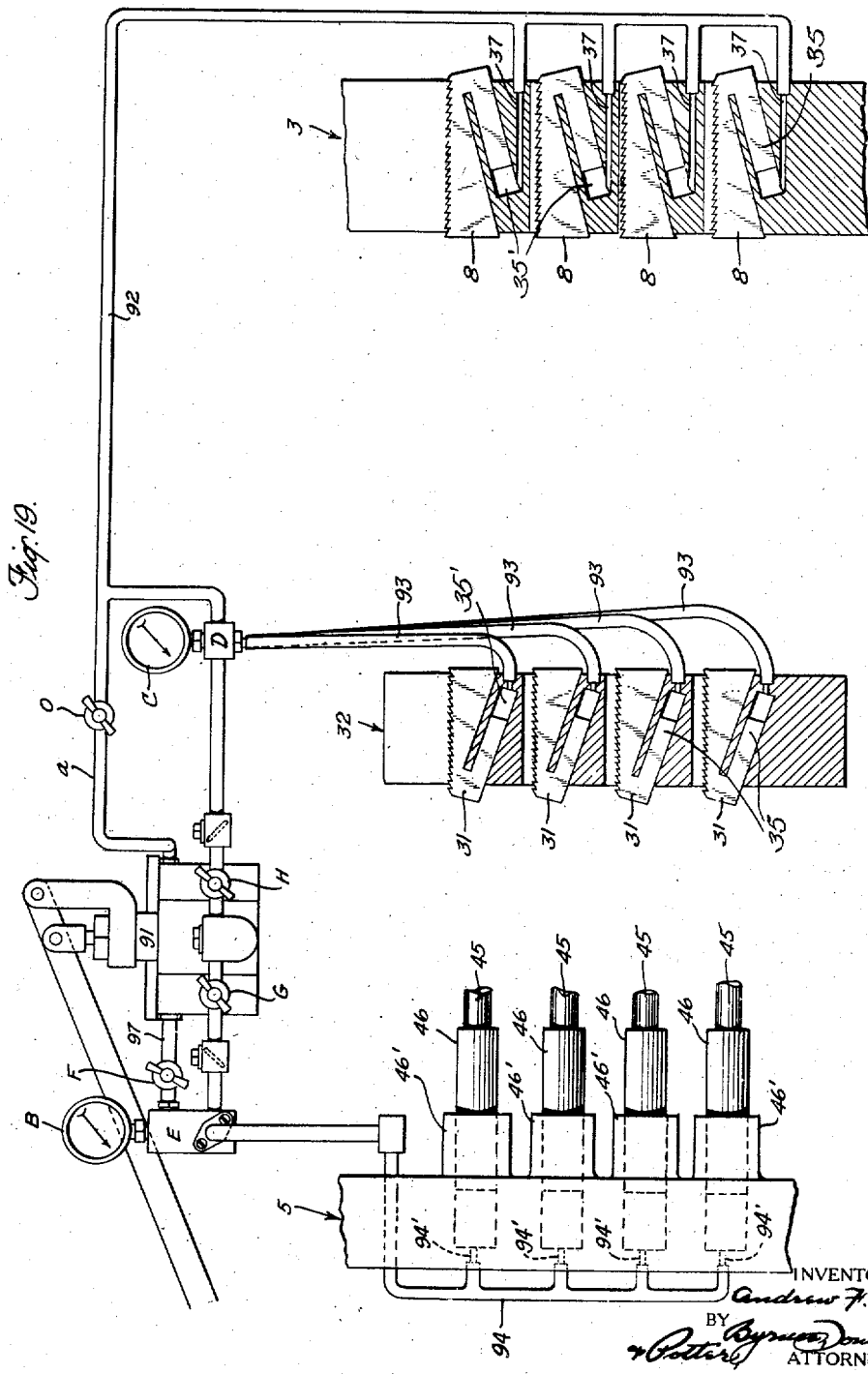

Patented July 14, 1936

2,047,305

UNITED STATES PATENT OFFICE 2,047,305

WELDING MACHINE

Andrew F. Bell, Buffalo, N. Y., assignor, by mesne assignments, to Union Carbide and Carbon Corporation, a corporation of New York Application June 30, 1930, Serial No. 464,984

23 Claims. (Cl. 78—85)

The invention relates to butt welding machines which are especially useful for butt welding hollow objects such as pipes and cylindrical objects but other forms may be welded.

One object of the invention is to provide a machine in which the weld may be produced by impacting the ends of the heated articles.

Another object of the invention is to provide means for welding hollow articles without the use of mandrels.

Another object of the invention is to provide controlling devices for the various operations necessary for producing the welds which devices may be controlled by one operator.

The invention will be more fully understood from the description which refers to the drawings constituting a part hereof in which:

Figure 4 is an enlarged cross sectional view of the supply drum taken along the line 4—4 of Fig. 3.

Figure 5 is a vertical sectional view of the machine taken substantially along the line 5—5 of Fig. 1.

Figure 6 is a vertical sectional view of the machine taken along the line 6—6 of Fig. 1.

Figure 7 is an enlarged sectional view of a pipe clamping device taken along the line 7—7 of Fig. 6.

Figure 8 is an enlarged view showing parts of the torch drum and the driving member for the torch drum and the hose supply drum partially in section and partially in elevation.

Figure 11 is an enlarged view of one of the welding torches with parts broken away showing the nozzle tip and the mixing nozzles in section.

Figure 12 is a cross sectional view of the burner ring taken along the line 12—12 of Fig. 11.

Figure 13 is a cross sectional view of the torch ring taken along the line 13—13 of Fig. 12.

Figure 14 is a cross sectional view and an end elevational view of the gas mixing nozzle shown in Fig. 11.

Figure 16 is an enlarged sectional view of the lower rollers taken along the line 16—16 of Fig. 3.

Figure 17 is a top plan view of the lower rollers.

Figure 18 is an enlarged sectional view of the upper rollers taken along the line 18—18 of Fig. 3 and Figure 19 is a diagrammatic representation of the arrangement of the hydraulic elements and the clamping means which are associated therewith.

Figure 1:
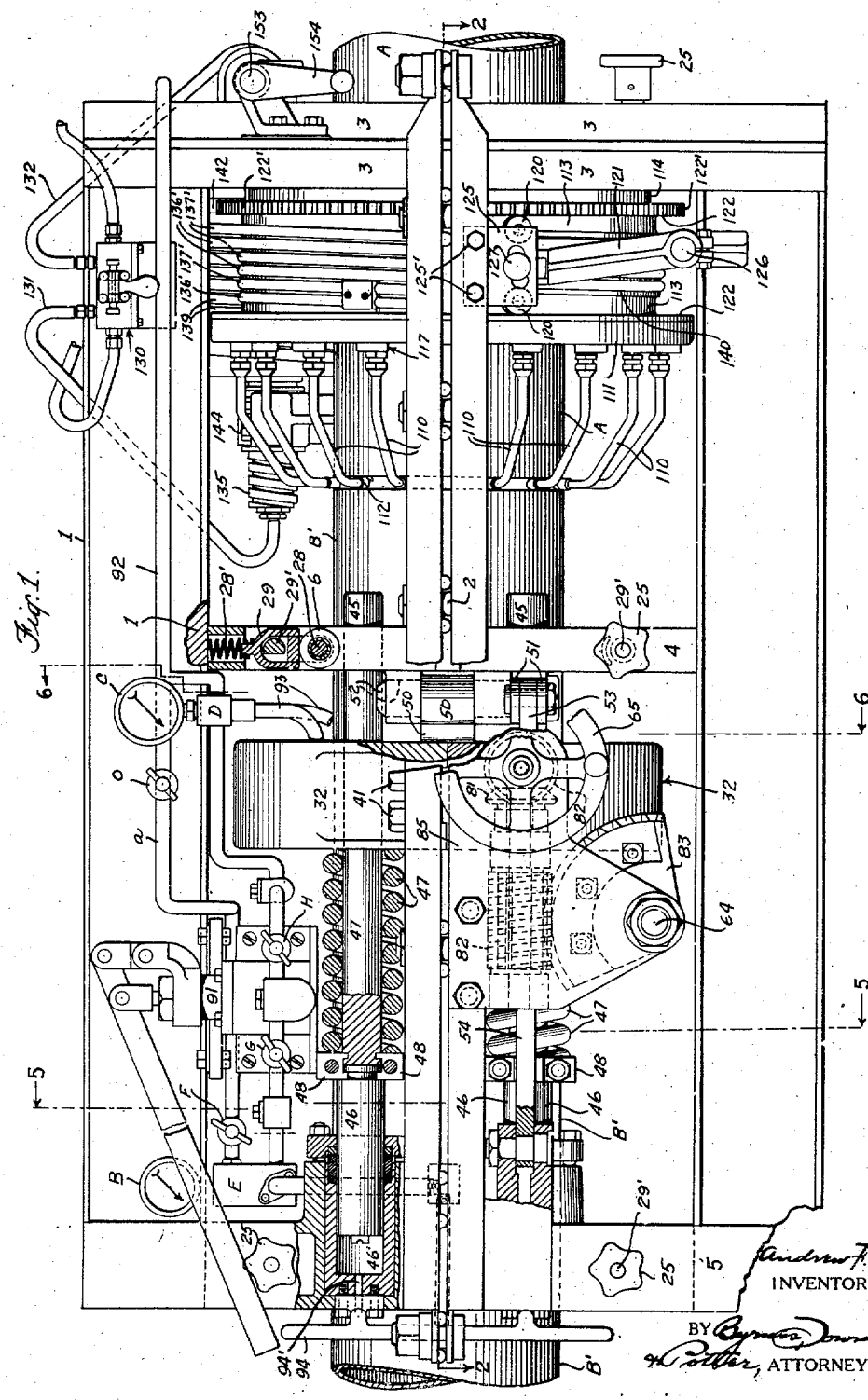
Figure 1 is a left side elevational view of the machine with parts broken away.

The machine is mounted on a frame preferably consisting of longitudinal I beams 1 of which there may be four. The side longitudinal beams preferably; but not necessarily consist of upper and lower halves which may be taken apart and fastened together by bolts 2. Yokes 3, 4, and 5 are fixedly secured to the longitudinal beams, the beams serving to form tying members for yokes 3, 4, and 5. The yokes preferably consist of upper and lower halves which are split in a horizontal plane and welded to the side I beams. The upper and lower halves of the yokes may be held together by the bolts 2 which pass through the beams but other bolts on the yokes may be used to make the structure more rigid.

The yokes 3, 4, and 5 carry upper supporting guide rollers 6 and lower guide rollers 7 and the yoke 3 carries clamping jaws 8. Pairs of guide rollers 6 arranged longitudinally are used in yoke 3 and single rollers 6 are used in yokes 4 and 5. All guide rollers are preferably in the form of conical frustums with their smaller bases adjacent so that their contact will be along two separated longitudinal elements of a cylindrical object. The upper guide rollers 6 are mounted transversely of the longitudinal axis of the machine on their respective yokes so that the machine may be supported on the rollers and travel along a track, pipe or other object which object may be disposed longitudinally through the machine.

As shown in Fig. 18, the pair of guide rollers in yoke 3 with their axes parallel are mounted on the outer ends of levers 10 which levers are pivotally supported on and attached to the yoke at their ends by the shaft 11. Springs 12 which are compressed between the yoke 3 and the levers 10 between the pivotal support 11 and the rollers tend to hold the rollers in an extended position and to impress lever 10 away from cam 13 which is mounted to turn on a shaft 14 in the yoke 3 and is operated by the wheel 15. When the machine rests on the rollers, the springs are compressed and the cams 13 may be turned down so that both rollers will be spaced on a given diameter and in alignment. The cams serve to preserve the desired alignment of the rollers 6 and the alignment of the object in the machine when the weight of the machine rests on the object and they provide for changing the alignment of the pipe in the machine.

The lower pairs of guide rollers 7 in the yoke 3 are similar to the rollers 6 and are diametrically opposed to the rollers 6 so that they can be brought up snugly underneath the object which supports the machine when it is rolled along the pipe. As shown in Figures 16 and 17, the rollers 7 in yoke 3 are mounted to revolve on the shafts 20 in the mounting 21 which has lower faces 22 inclined toward each other. Sliding collars 23 with inclined faces engaging the inclined faces 22 are threaded on the shaft 24. The threads on shaft 24 are right and left threads and mounted to be turned in the yokes by means of the hand wheel 25. When the hand wheel 25 is turned in one direction the collars 23 will move toward each other and elevate the mounting 21 and rollers 20 to engage the object. Movement of the hand wheel 25 in the opposite direction permits the rollers to recede from the object. Tongues 26 on the opposite sides of the mounting 21 slide in grooves 27 in the yoke 3 and prevent longitudinal movement of the rollers.

Single rollers 6 are mounted on a spring mounting in yokes 4 and 5. The rollers 6 constitute the upper aligning members and serve as bearing members when the machine is rolled along a pipe. The rollers are mounted on a shaft 28. The shaft is supported by a guide member 29 which is adapted to slide up and down in a guide slot in the yoke. A spring 28' which impels the roller outwardly is mounted between the end of the guide member 29 and the yoke and a shaft 29' having a cam surface is mounted on the yoke and passed through an opening in the guide member. The shaft 29' is turned by the hand wheel 25 and the cam engages the surface in the guide member to regulate the elevation of the roller.

The lower guide rollers 7 in yokes 4 and 5 are preferably mounted like rollers 6. They may be supported on shafts which are supported in turn on mountings which have an inclined lower surface and the mountings may be raised and lowered by the hand wheels 25 which are threaded to move the inclined surfaced collars back and forth in a manner similar to the lower rollers 7 in the yoke 3.

Figure 3:
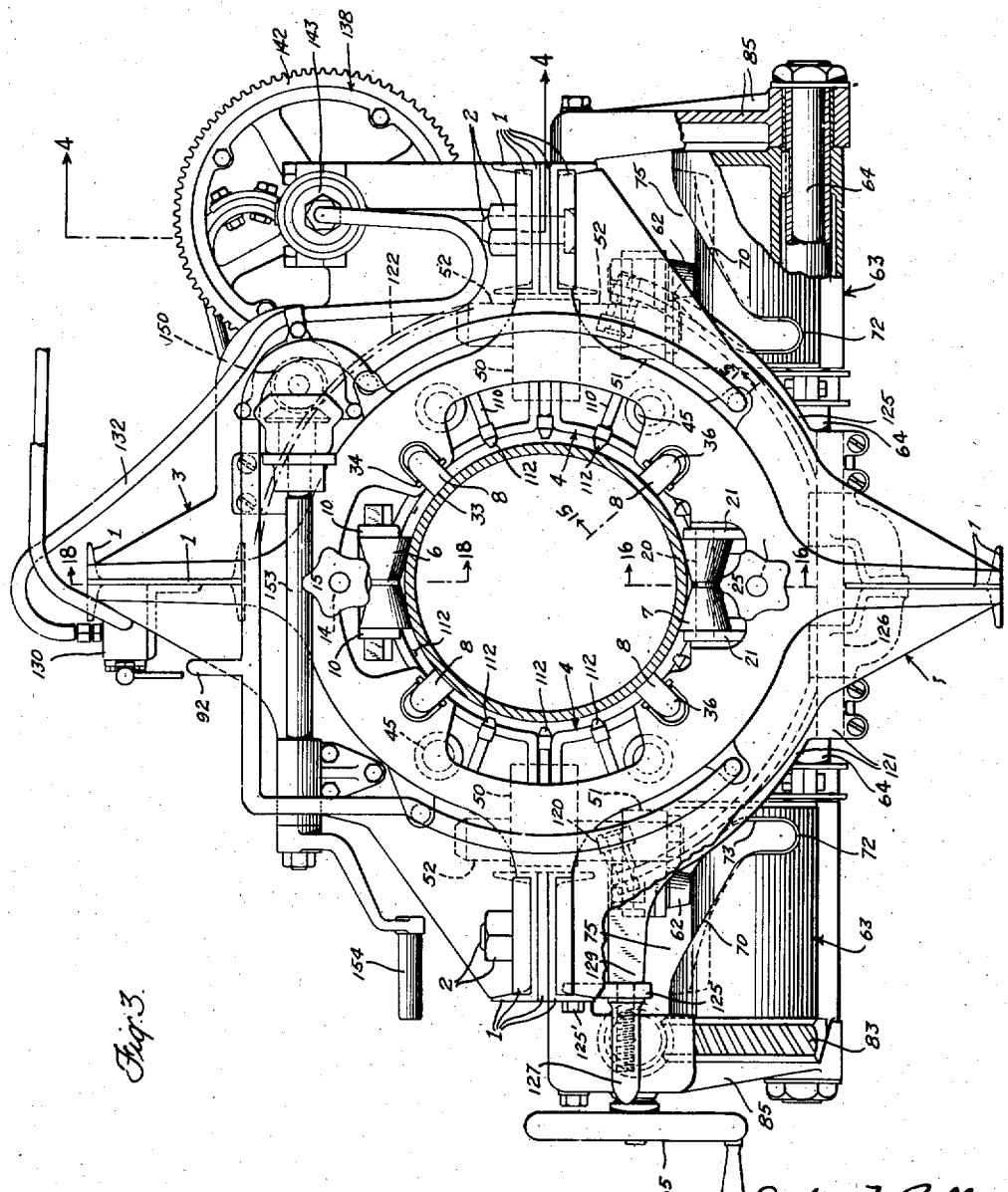
Figure 3 is a right end elevational view of the machine showing parts broken away and parts in section.

When the object is engaged by the rollers 6 and 7, it may be clamped by actuating the jaws 8 in the yoke 3 to clamp the relatively fixed pipe and the machine in alignment. Another set of jaws 31 is mounted in the longitudinally movable ring clamp 32 to clamp the relatively movable pipe. The jaws 8 and 31 are similarly constructed. Four jaws diametrically spaced, as shown in Fig. 3, are preferably used in the yoke 3, and in the ring clamp 32 so that the object which is held from vertical movement by the rollers 6 and 7 will be held from longitudinal movement when it is engaged by the jaws.

Figure 15:
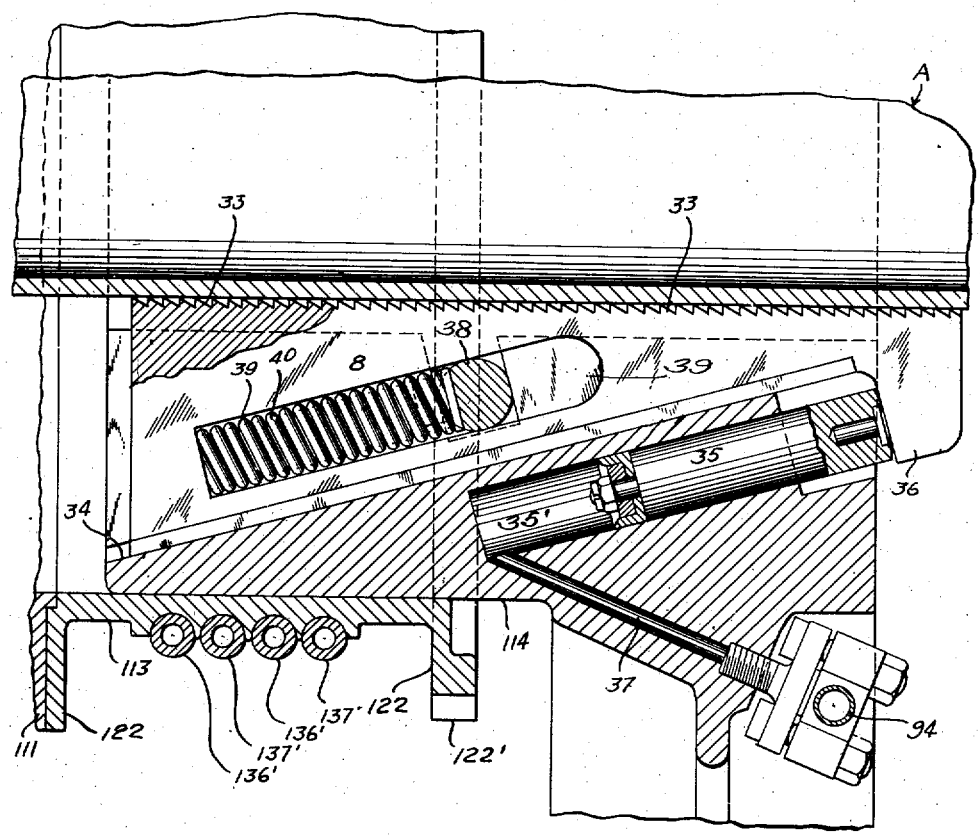
Figure 15 is a cross sectional view of a pipe clamping device taken along the line 15—15 of Fig. 3.

As shown in Figures 7 and 15, the gripping faces 33 of the jaws are roughened to bite into the object to be clamped. The jaw moves in and out radially in a longitudinal slot which is cut in the internal surface of the yoke 3 and the ring clamp 32 to provide a bearing surface 34 for the jaws 8 and 31, which is inwardly inclined away from the space between the yoke and the ring clamp. The corresponding face of the jaw is inclined so that the gripping face will be moved radially and longitudinally of the object to be gripped when the jaw is moved in one direction. Each of the jaws 8 and 31 are operated by pistons 35 in cylinders 35' in the yoke 3 and the ring clamp 32. The axis of the cylinders 35' are parallel to the inclined surfaces 34 and the outer end of the pistons 35 abut against an abutment 36 on the jaws 8 and 31. A slot 39 parallel to the surface 34 is formed in each of the jaws 8 and 31. A pin 38 is passed through the slot and is secured on each side in the yoke 3 and the ring clamp 32. A spring 40 is compressed between the pin 38 and the lower end of the slot so that it urges the jaws to the lower end of the incline 34. When the fluid pressure drives out the piston to clamp the object, the spring 40 is compressed and when the fluid pressure on the piston is released the springs return the jaws to their initial position where they are stopped by the engagement of the end member 36 with the face of the yoke 3 or the ring clamp 32. The jaws 8 in the yoke 3 and the jaws 31 in the movable clamp 32 are preferably arranged to move in opposite directions longitudinally and away from each other when the objects are clamped but they may be arranged to move in the same direction. The roughening of the jaws is preferably in the form of wedge-shaped teeth or ridges which are inclined toward the plane in which the pipes are joined so that when the ends of the pipes are driven together, the ridges or teeth will be forced into the pipe and prevent slipping.

The longitudinally movable ring clamp 32 may consist of upper and lower parts which are divided along the plane of division of the side I beams 1 and the yokes 3, 4, and 5 and held together by bolts 41. The ring clamp 32 is mounted to slide on rod supports 45 which are supported in turn at their ends to slide in the yoke 4 and at their other ends to slide in the hydraulic cylinders on the pistons 46 which are mounted in yoke 5. Springs 47 are mounted on the rods 45 so that the springs can be compressed between the clamping ring 32 and spring stop members 48 on the rods when the rods are propelled in one direction by fluid pressure acting on pistons 46 in the cylinders 46'.

The clamping ring 32 moves with the relatively movable object and operates on the relatively movable object in producing the weld. The ring 32 is actuated in one direction without turning by the springs 47 which are compressed against the clamping ring and impress forces on it which produce an impacting of the ends of the pipes A and B when the pipes are heated to a welding temperature and the ring 32 is released. The ring 32 is actuated in the opposite direction without turning the pipe held against the impact-producing forces which are impressed upon it by the springs 47, and released without turning the pipe so as to permit the clamp and relatively movable pipe to move forward at a high velocity and strike the fixed pipe with a sharp hammer blow, by means of the adjustable stop members or involute cams 50.

An irreversible mechanism is provided to position the clamping ring 32 in an intermediate and withdrawn position, and also to release the clamping ring to permit it to be forced to a forward position under the action of the impact producing forces impressed on the clamping ring. By irreversible mechanism it is intended a mechanism which cannot be actuated by the forces exerted by the springs 47. The irreversible mechanism comprises the cams 50 and a mechanism now to be described to control the cams. The cams 50 on diametrically opposite sides of the clamping ring 32 are mounted to turn with shaft 52 mounted in fixed brackets on yoke 4. One end of the cranks 51 is fixed to the shafts 52 and the other end is connected to toggles which comprise arms 53 and 54 supported on yokes 4 and 5 respectively. The midpoints of the toggles carry pins 60 upon which rollers 62 are mounted. The rollers 62 engage quadrant cams formed on the cylindrical surfaces of the quadrants 63. The quadrants 63 on opposite sides of the machine are turned as a unit on the shaft 64 by a hand wheel 65 through a train of gears as hereinafter to be described. Turning the quadrant in one direction causes the rollers 62 to travel from the impact or forward position 75' on the face of the cam 63 along the face 70 to the point 72 of the cam where the toggles are placed in the clamping position. In the clamping position the involute cams 50 and ring clamp 32 are in intermediate positions. The jaws 8 and 31 in the yoke 3 and in the clamping ring 32 are then actuated to grip the end to end contacting pipes.

Figure 2:
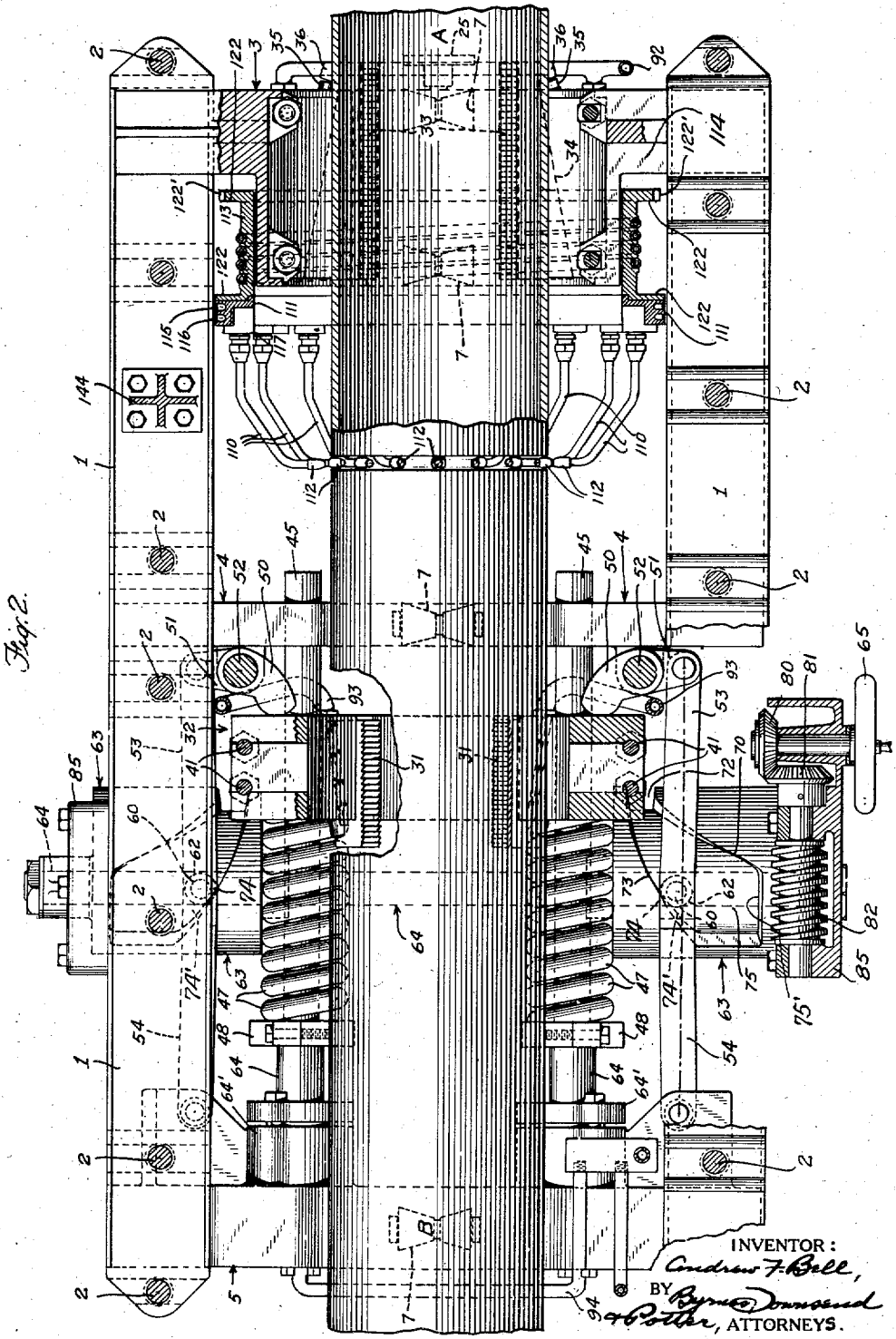
Figure 2 is a longitudinal section of the machine taken substantially on the line 2—2 of Fig. 1.

By turning the quadrants in the opposite direction the rollers 62 move along the surfaces 73 of the cam to rest position 74 and bring the toggles up to or nearly to their dead center as shown in Figure 2. In passing to position 74 the involute cam 50 is turned and it withdraws the clamp 32 along its supporting rods 45 and spaces the end of the movable pipe B a short distance, say 1 inch, from the end of the fixed pipe. With the clamp 32 restrained in position 74 by the involute cam 50, the springs 47 are compressed between the spring stops 48 and the pressure ring 32 by impressing fluid under pressure on the pistons 46, moving the rods 45 and forcing stops 48 against the springs 47.

When the ends of the pipes are heated to a welding temperature by a device hereinafter to be described, the quadrant 63 is turned slightly to carry the rest position 74 of the cams past the rollers 62 and carry the throwing face 74' of the cam 63 against the rollers 62 to throw the toggles over the dead-center point. This permits the toggle to buckle and throw the roller 62 through the free space 75 in the cam, carrying the involute cam 50 instantaneously into an extreme forward position and permitting the springs 47 to throw the clamp ring 32 and the movable pipe clamped thereto without restraint and at a high velocity against the end of the fixed pipe.

The size of the springs 47 is regulated and the amount of compression produced in the springs by the forward movement of the rods 45 and spring stops 48 is regulated so that the ends of the heated pipes will be given a sharp forcible hammer blow upon impact thus forcibly ejecting surface oxides from the heated ends and consolidating the ends of the pipes. The free spaces 75 in the cams are made wide enough to permit the involute cams 50, the clamping ring 32 and the relatively movable pipe to move forward farther than their clamping positions so that the heated pipes will form a circumferential bead around the pipe when the pipes are impacted and the impacted ends will remain forcibly compressed without rebounding at the end of the stroke.

A miter gear 80 is actuated by the hand wheel 65 and meshes with the miter gear 81 to turn the worm 82 which in turn meshes with the segment gear 83 on the quadrant 63. The quadrant cams are keyed on a shaft 64 which is supported at its ends and journaled in brackets 85 on the frame 1 so that the cams and toggles on both sides of the ring 32 are actuated as a unit.

The clamp jaws in the yoke 3 and in the clamping ring 32 and the hydraulic spring compressing pistons 46 in the cylinders 46' are actuated by a central fluid pressure system which is mounted on the upper I beams 1, as shown in Figs. 1, 2, 5, 6, and 19. The system consists of a pump which may be manually operated by a handle attached to a reciprocally movable piston in the cylinder 91. A fluid pressure line 92 with branches leading to the conduits 37 of the cylinders 35 in the yoke 3 is connected with the fluid under the pump pressure and regulated by the valve H. Line 92 communicates with the valve H through a header D. From the header D a pipe connection is made to line 92 and flexible conduits 93 lead individually to the four cylinders 35 in the clamping ring 32. Fluid under pressure is supplied by the pump to the four spring compressing cylinders 46' through valve G, header E and pipe 94 which is connected to the cylinders by passages 94' through the yoke 5. The fluid is retained under pressure in the clamp compressing cylinders 35 and in the spring compressing cylinders 46' by turning the shut-off valves H and G in the pressure lines.

The pressure in the jack compressing cylinders is relieved by opening valve O in line (a) and returning the fluid to the pump. The fluid in cylinders 46' is returned to the pump through the header E, and lines 94 and 97 by opening the valve F. Pressure gauges B and C are suitably connected in the pressure lines to indicate the pressure in the spring compressing cylinders 46' and the clamp compressing cylinders 35 respectively.

Figure 9:
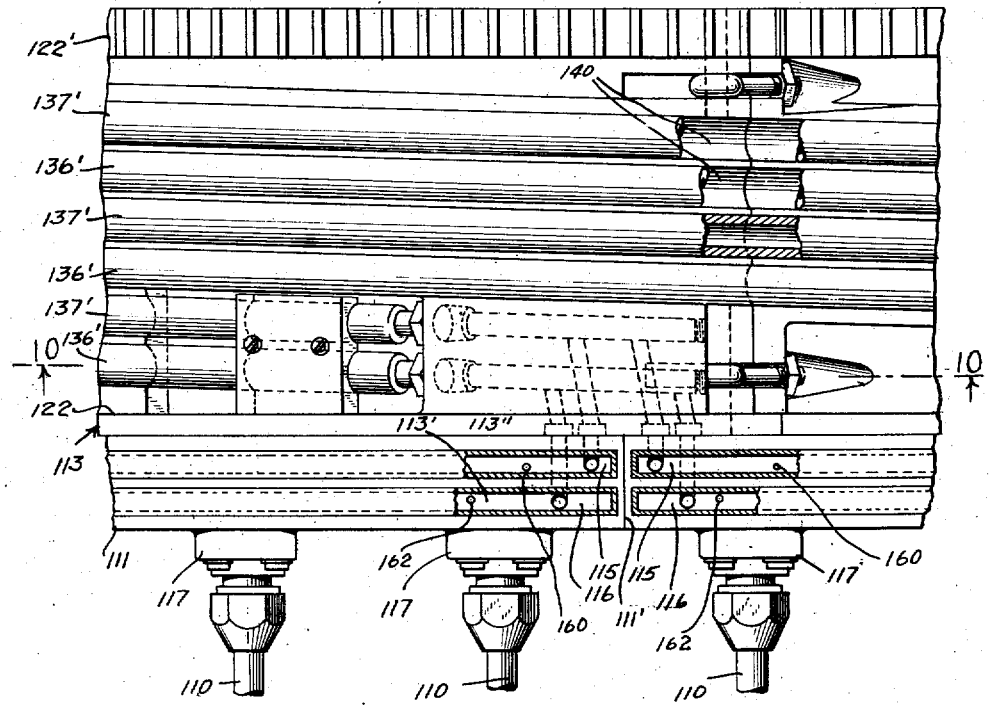
Figure 9 is an enlarged elevational view of a part of the torch drum.
Figure 10:
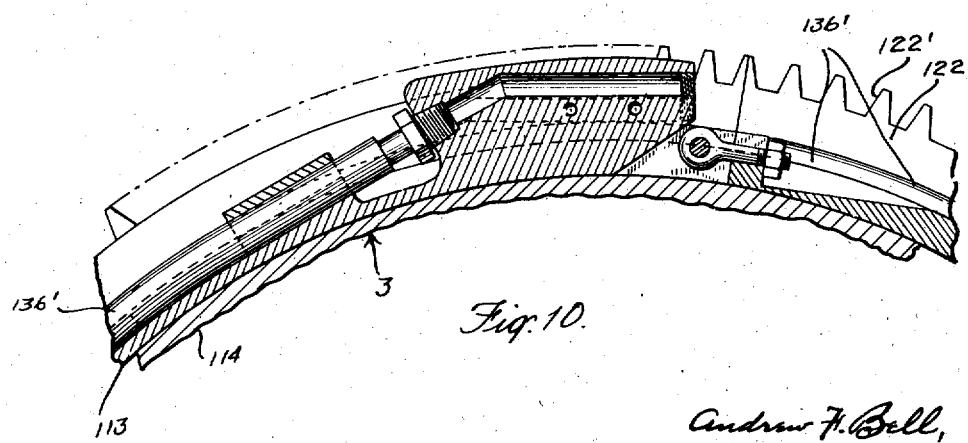
Figure 10 is a cross sectional view of the torch drum taken along the line 10—10 of Fig. 9.

A plurality of torches 110 are mounted on a split bored burner ring 111 with their tips 112 arranged circumferentially on a diameter larger than the pipes to be welded and near the pipes so that the ends of the pipes can be brought together without engaging the tips. The burner ring 111 is mounted on a cylindrical hose reel 113 which reel is adapted to revolve on a split collar 114 on yoke 3. The burner ring 111 is preferably made in two parts and joined by a gas tight connection, as shown at 111' in Fig. 9. The ring has a circumferential combustible gas passage 115 and a corresponding oxygen passage 116 to conduct gases to the mixers 117 for each of the torches. The mixed gases pass through the torches to the tips 112 which have two terminal bores 118 and 119 arranged diametrically in the tips. The bores 118 and 119 direct the flames crosswise and at an angle of about 50 degrees to each other so that the flames do not impinge upon each other. The tips are positioned sufficiently close to the pipes to be welded so that each pair of oblique flames are directed on opposite end faces of the spaced pipes. In the preferred adjustment of the torches, the orifices in the tips are arranged between the planes of the end surfaces of the pipes to be welded and in a plane approximately midway between the ends. The flames which impinge on a given end face of a pipe are reflected back onto the end face of the other pipe. Thus, the inner layers of metal will be heated to a higher temperature than the outer layers so that an outwardly extending circumferential burr will be formed when the ends of the pipes are struck together.

During the heating the burners are revolved preferably through at least one complete revolution by turning the hose reel 113 so as to give uniform circumferential distribution of heat. The torch tips are adjusted longitudinally of the pipes by a backward or forward movement of the rollers 120 on the arms 121. The rollers engage the flanges 122 of the drum 113 and slide the drum over the collar 114.

The arms 121 constitute a yoke which is mounted to turn on a shaft 126 adjacent the end yoke 3. A handle 127 which projects over the edge of the frame through a slot in a guide plate 125 bolted to side I beam 1 is adapted to rock the yoke back and forth. The handle 127 may be threaded on the arm 129 so that it can be screwed down against the guide plate 125 to lock the yoke and the torches in any desired longitudinal position.

Combustible gas and oxygen or air are conducted to the torches 110 from sources of supply through the compound shut-off valve 130, flexible connections 131 and 132, yielding connections 131' and 132' on the ends of the hollow shaft 135, passages 133 and 134 in the hollow shaft 135 to hose connections 136 and 137 respectively. The hoses 136 and 137 are passed through openings in the storage drum 138 and wound around the drum 138, which is keyed to the shaft 135. The other ends of hoses 136' and 137' are passed through openings in the drums 113 and are attached to gas and oxygen passages 113' and 113'' in the drum 113 which connect with the passages 115 and 116 in the ring 111.

Sufficient lengths of the hoses 136 and 137 are preferably wound around the storage drum 138 in the grooves 139 so that the drum 113 may be revolved forward and back through a given number of complete revolutions, say two. In this operation the hoses are unwound from drum 138 and wound upon the drum 113 in the grooves 140. The storage drum 138 has a flange 141 on one end and a ring gear 142 on the other end. The diameter of the storage drum 138 about which the hoses are wound is smaller than the diameter about which the hoses are wound on the main drum 113. In order to wind the same length of hose on the smaller drum 138 as it is unwound from the larger drum 113, the smaller drum is made longer to provide for a greater number of turns of the hoses thereon. The drums are so geared that their peripheral speeds are equal, therefore in order to compensate for the difference in length in the two drums and to maintain the portion of the hoses which extend between the drums in line with the winding and unwinding groove on the drums, one end of the shaft 135 is permitted to slide longitudinally in its journal 144' and the other end of the shaft 135 is provided with threads 135' which coact with threads in the shaft journal 144 to cause the shaft 135 and the drum 138 to travel longitudinally at a rate proportional to the peripheral travel of the drums as may be required to keep the portion of the hoses which extend between the drums in line with their grooves as the hoses are wound or unwound from the drums. Where the diameter of the two drums about which the hoses are wound are equal, this longitudinal travel of one of the drums is not necessary.

The ring gear 122' on the hose drum 113 and the ring gear 142 on the storage reel 138 mesh with an elongated pinion 150 which is mounted on the yoke 3. A miter gear 151 on the pinion 150 meshes with a miter gear 152 on a shaft 153 and the train is operated through the shaft 153 by the crank 154. By turning the crank 154 in one direction the storage reel 138 feeds hose onto the drum 113 at the same rate as the drum 113 is turned and the reel 138 travels to one side keeping the grooves on reels 138 and 113 in alignment. The torches which are attached to the drum 113 are thereby made to travel circumferentially around the ends of the spaced pipes whilst the obliquely directed flames impinge on the confronting faces of the pipes. In heating the ends of the pipes to a welding temperature, it is usually sufficient to give the torches two complete revolutions around the pipe and to return them to their initial position. The turning of the torches through one or more complete revolutions avoids unequal circumferential heating of the pipes which would occur if the torches were rocked through a smaller angle and one torch were not adjusted to give a flame exactly like the others.

The torches 110 are mounted on the ring 111 which is mounted in turn on the drum 113. As shown in Fig. 11 the oxygen and gas which are conducted to the circumferential passages 115 and 116 respectively by the oxygen-and-gas conducting hoses are connected through the passages 160 and 162 respectively with the gas mixer. Regulating valves 164 and 166 are seated in the passages 160 and 162 to regulate the flow of oxygen and gas to the mixers. The valves are similarly constructed and comprise a threaded head 168 on the valve operating rod which is screwed into a threaded countersunk bore 170 in the ring 111. The threaded heads 168 may be slotted so that they can be turned out or in with a screwdriver to vary the gases supplied to the mixers. When the valves are adjusted the bore 170 is sealed by the plug 169.

The mixers are contained in a tapered plug 171 which is accurately machined to form a gas tight connection in a tapered bore in the ring 111. The plug 171 has an annular groove 172 which connects with the oxygen passage 160 and with the radial bores 174. The plug 171 is given a flat-bottomed inner bore and the outer end is threaded. The mixing nozzle 175 is mounted in the bore.

The inner end of the mixing nozzle 175 is made to fit the lateral surfaces of the inner bore and the outer end of the nozzle is enlarged and threaded to engage the threaded portion of the bore so that the nozzle can be screwed down on a gas tight seat 176 and the flattened end of the nozzle can be spaced a short predetermined distance from the flattened bottom of the bore.

A reduced portion between the ends of nozzle 175 provides an annular gas passage 177 around the nozzle. The end 178 of the mixer is pierced with a plurality of small regularly spaced bores 179 which form gas passages between the annular passage 177 and the narrow passage 180 between the flattened end of the nozzle member 175 and the flattened bottom of the bore. An annular groove 181 in the plug 171 adjacent the end of passage 162 constitutes a gas passage around the plug 171. Communication between the annular groove 181 and the passage 177 is made by bores 182 through the wall of the plug.

The mixing nozzle 175 has a smooth internal axial bore 184 which is terminated at its entrance by a small restricted bore 185. The bore 185 opens into a space 186 between the threaded head 187 of the nozzle and a plug 188 which is screwed into the end of the plug 171. The bore 184 is coextensive with a similar bore 190 through the inner end of the plug 171, the bore 191 in the nipple 192 and the bore 193 in the goose-neck 194.

The oxygen which is supplied to the passages 115 in the ring 111, passes through the bore 160, around valve 164 to passage 172 and through the bores 174, 185, and 184 to the end of the nozzle 175 where it mixes with the gas which comes around the flattened end of the nozzle. The gas from passage 116 passes through the bore 162 around the valve 166 to the annular passage 181, and then through the passages 182, annular passage 177 and holes 179 into the narrow passage 180 at the end of the nozzle 175. The gases are mixed and conducted to the nozzle tip through the passages 190, 191 and 193.

The tapered plug 171 has a reduced portion 196 at its outer end which forms a recess for the hollow plug 198. The plug 198 is externally threaded to screw down over the reduced portion 196 and a packing may be held in the space at the inner end of the plug to produce a gas-tight joint and hold the tapered plug 171 in place.

The outer end of the hollow plug 198 is externally threaded and faced at the end to fit the rounded end of the goose-neck 194. A union 200 is screwed down on the external threaded end of the nipple so as to engage a shoulder 202 on the goose-neck and hold the goose-neck in place. Adjustments in the positions of the torches may be made by loosening the nuts 200.

The operating devices for controlling the gases, the torches, the quadrant cam, and the hydraulically operated mechanisms are shown mounted along one side of the machine within reach of one operator who may be stationed at one side of the machine.

In operation the machine may be aligned with a fixed pipe A along which it may be rolled on the rollers 6, and positioned so that the end of the pipe will be located approximately within the circle of torch tips 112. The relatively movable pipe B is aligned in the machine with its end in contact with the fixed pipe. The pipes A and B may also be placed on skids and the machine may be rolled on both pipes. The lower guide rollers 7 are brought into contact with the pipes and the hydraulic clamping jaws 8 and 31 in the yoke 3 and pressure ring 32 are operated to clamp the pipes by opening the valve H and operating the oil pump to produce the desired fluid pressure against the pistons 35 which is indicated by the pressure gauge C. The valve H is then closed. Before the ring 32 is clamped it is placed in the clamping position by bringing the toggle roller 62 to the point 72 in the cam 63 with the ring 32 in contact with the involute cam 50.

After the pipes are clamped, the quadrant cam is operated to bring the roller 61 to the rest point 74, thereby withdrawing the ring 32 and movable pipe a short distance to space the ends of the pipes as shown in Fig. 11, and positioning the toggle at or about its dead center as shown in Fig. 2.

The springs 47 are compressed between the spring stops 48 and the ring 32 by opening valve G, and pumping oil through the header E and line 94 until the desired pressure is indicated by the pressure gauge B. The oil passes under pressure against the pistons 46 which slide the rods 45 through the openings in the ring 32 and the yoke 4 and compress the springs 47 between the clamping ring 32 and the spring stop 48. The valve G is then closed.

The torches are adjusted around the spacing between the pipes, lighted and the ends of the pipes are heated to a welding temperature by revolving the torches through at least one complete revolution in the manner hereinbefore described. A desirably equal distribution of heat may be obtained by giving the torches two complete revolutions and then returning them to their initial positions. When the ends of the pipes are heated to welding temperature, the quadrant cams 63 are moved in the direction of the leader arrow 63 in Fig. 2 to throw the toggles over their dead centers and freely release the involute cams 50 and the clamping ring 32. The energy in the springs 47 throws the clamping ring 32 and movable pipe forward bringing the ends of the pipes together with a sharp forcible hammer blow which breaks and ejects the scale, compacts the metal at the ends of the pipe together and forms a circumferential burr around the outside of the pipe.

The flames may desirably be continued during the impacting of the pipes so as to prevent the least cooling of the metal before the impact, but the flames may be discontinued by operating the quick shut-off valve 130 just at the moment of impact or at other desirable times without permitting the metal to cool. It is advantageous to impact the pipes as soon as the ends of the pipes have attained a welding temperature to avoid overheating the metal.

By traversing the weld with the flames after the impacting of the pipes, the burr is melted down to smooth the weld to the diameter of the pipes and to fuse together the outer layers of metal which in some instances may not have been perfectly welded by reason of their slightly lower temperature as compared to the inner layers of metal.

In the use of heavy machines for welding large sized pipes, the fixed pipe and the movable pipe may be supported and roughly aligned on skids and the machine may be transported along the pipes as upon a track by rolling it along on the upper rollers 6.

The parts of the machine which encircle the pipes have been described as consisting of upper and lower parts so that the machine may be taken apart and placed around a pipe line without otherwise disassembling the machine. It is also contemplated by this construction that the upper or the lower parts of the machine may be separated, as by hinging so as to open up and admit of the placing of the pipes in the machine.

It is evident that the bi-parted elements of the machine may be made in one piece and various modifications of other specifically described structures may be made without departing from the invention. Therefore I do not wish to restrict my invention except by the limitations imposed by the prior art and by the invention as defined in the annexed claims.

I claim:

1. A welding machine which comprises a frame, means on the frame to align therewith a relatively fixed object and a relatively movable object, a clamping ring adapted to clamp the relatively movable object, means on the frame to support the clamping ring and permit longitudinal movement with respect to the frame, and a spacing and releasing irreversible mechanism adapted to position the ring in predetermined intermediate and withdrawn positions and thereafter permit a forward movement of the ring beyond the intermediate position, said machine having means for impacting the ends of the objects to be welded after the ends have been raised to a welding temperature.

2. A welding machine which comprises a frame, means on the frame to align therewith a relatively fixed object and a relatively movable object, a clamping ring adapted to clamp the relatively movable object, means on the frame to support the clamping ring and permit longitudinal movement with respect to the frame, and a spacing and releasing irreversible mechanism adapted to position the ring in predetermined intermediate and withdrawn positions and thereafter permit an unrestricted forward movement of the ring, said machine having means for impacting the ends of the objects to be welded after the ends have been raised to welding temperatures.

3. A welding machine which comprises a frame, means on the frame to align therewith a relatively fixed object and a relatively movable object, a clamping ring adapted to clamp the relatively movable object, longitudinally movable supports on the frame adapted to support the ring and permit relatively longitudinal movement of the ring with respect to the frame and the supports, and a device adapted to position the ring in predetermined intermediate and withdrawn positions, means for storing energy against said ring between said ring and said frame, means to suddenly release said energy to cause a forward movement of the ring beyond the intermediate position.

4. A welding machine which comprises a frame, means on the frame to align therewith and clamp a relatively fixed object, means to dispose a relatively movable object in alignment with the fixed object, a clamping ring capable only of longitudinal movement and adapted to clamp the movable pipe, means to space the ring in predetermined intermediate and withdrawn positions, means to impress impact-producing forces on the ring when it is in the withdrawn position, and means to release the ring under the pressure of the impact producing forces.

5. A welding machine which comprises a frame, means on the frame to align therewith and clamp a relatively fixed object, means to dispose a relatively movable object in alignment with the fixed object, means to clamp said objects, means to support said clamps, said clamping means comprising jaws having a lower surface inclined to the axis of the objects and adapted to coact with similarly inclined portions of their supports, hydraulic cylinders on the supports, hydraulic conduits connected to said cylinders and to a source of pressure, pistons in said cylinders to advance the jaws along said inclined surfaces, means on the jaws to engage said pistons, and means disposed between said jaws and the supports to return the jaws to non-clamping positions.

6. A welding machine comprising means to align and fix a relatively fixed pipe and a relatively movable pipe therein in spaced apart confronting relation, a plurality of torch tips arranged on a circumference which is greater than the circumference of the pipes to be welded and provided with means to heat the confronting ends of the pipes simultaneously, means rotatable about the axis of said pipes to support said tips, means to supply gases to said tips which includes a pair of rotatable and longitudinally movable rotors adapted to carry flexible conduits, and means to store impact-producing forces on the clamping means for said movable pipe.

7. A welding machine comprising means to align and clamp a relatively fixed pipe and a relatively movable pipe therein in end to end contact, a longitudinally movable clamping ring adapted to clamp said movable pipe, a member for spacing, restraining and releasing said ring, a toggle linkage adapted to operate said member, and means to dispose said toggle in predetermined intermediate and dead-center positions and permit an extreme release position, said means comprising a cammed member, and a projecting member on the toggle to engage said cammed member.

8. A welding machine comprising a frame; means on said frame to align two pieces of pipe to be welded; a clamp for clamping one of said pipes in a fixed position and a second clamp for clamping the other pipe in an axially slidable position; a means for operating said second clamp, said operating means comprising a toggle linkage having one end operatively connected with said second clamp and the other end connected to said frame, and a lost motion mechanism for operating the knuckle of said linkage and to cause it to pass over its dead center point with an unrestrained movement.

9. A welding machine comprising means to align and clamp a relatively fixed pipe and a relatively movable pipe therein in end to end contact, a longitudinally movable clamping ring adapted to clamp said movable pipe, cams adapted to engage said ring for moving the ring longitudinally into a spaced position for retaining the ring and for releasing the ring, a toggle linkage adapted to operate said cam, and means to dispose said toggle in predetermined intermediate and dead-center positions and to permit an unrestricted release thereof, said means comprising a second cam, a projecting member on the toggle to engage said second cam and means to rotate said second cam.

10. In a welding machine, the combination of a heating device comprising a rotatable burner head, a means for supplying said head with separate supplies of oxygen and a combustible gas comprising a reel secured to said head and rotatable about the axis of said head, a second reel rotatable on a hollow journal substantially parallel to the axis of the first reel, an oxygen hose connected to an oxygen passage in said head at one end and adapted to be supplied with oxygen at the other end, through said hollow journal, a combustible gas hose connected at one end to a combustible gas passage in said head and adapted to be connected at the other end to a combustible gas supply in said hollow journal, each hose being wound in the same direction as the other hose on the same reel, and a means for simultaneously turning each reel at the same circumferential speed to wind the hose on one reel as it is unwound from the other reel.

11. A welding machine comprising means to align and clamp a relatively fixed pipe and a relatively movable pipe in end to end contact, means to space said pipes after they are clamped, means to store impact-producing forces on said clamp for said movable pipe, and means operable before, during and after said ends are in contact to heat the ends of the pipes including a conduit and means for reeling said conduit, said reeling means comprising a pair of spirally grooved rotatable and longitudinally movable rotors, ring gears on said rollers, a pinion engaging both ring gears for actuating the same, and means on one of said rotors to advance the same longitudinally as it is turned.

12. A welding machine comprising means to align and clamp a relatively fixed pipe and a relatively movable pipe in end to end contact, means to space said pipes after they are clamped, means to store impact-producing forces on said clamp for said movable pipe, and means operable before, during and after said ends are in contact to heat the ends of the pipes including conduits and means for reeling said conduits, said reeling means comprising a pair of spirally grooved rotatable rotors, means to actuate said rotors, a hollow threaded shaft on one of said rotors, yielding conduit connectors on the shaft, and threaded means co-operating with said shaft to actuate the drum longitudinally when it is turned.

13. A welding machine comprising a frame, means to align and clamp a relatively fixed pipe and a relatively movable pipe therein, a longitudinally movable clamping ring comprising clamps for the movable pipe, elongated longitudinally movable members for supporting the ring slidable in one portion of the frame, hydraulic cylinders on another portion of the frame to actuate and support said members, springs on said members, and stops on said members to compress the springs against said ring when the longitudinally movable members are moved in one direction.

14. A welding machine comprising a frame; means to axially align and clamp a relatively fixed pipe and a relatively movable pipe therein; mechanism on said frame for moving said movable pipe along the axis of said aligned pipes, said mechanism comprising a clamp slidable along the axis of said pipes and adapted to be clamped to said movable pipe, means for restraining and releasing said slidable clamp, a resilient means coacting with said slidable clamp, a hydraulic cylinder and a piston operating therein to compress said resilient means between said frame and said movable clamp to urge said slidable clamp against said restraining means.

15. A welding machine comprising means to space articles to be welded in predetermined confronting relation, means to heat the confronting spaced faces of said articles which includes a rotatable support having means to conduct gases, a plurality of torches on said support, and a gas mixer mounted in said support, said mixer comprising a plug having a centrally disposed bore having a flattened shoulder therein, and an axially bored mixing nozzle having a flat end spaced from said flattened shoulder to provide a narrow gas passage, an enlargement on the flattened end of the nozzle traversed by a plurality of gas passages, the other end of the nozzle having means to space the nozzle and a constricted passage to admit a jet of oxygen into the axial bore.

16. In a pipe welding machine a means for heating the ends of pipes to be welded, said heating means comprising a rotatable ring supported on an annular bearing, said ring having a circumferential oxygen passage and a circumferential combustible gas passage therein, a plurality of torches attached to said ring, a gas mixer in said ring for each torch and connected thereto, said ring having a pair of branch oxygen and combustible gas passages leading from said circumferential oxygen and combustible gas passages to each of said mixers, and a means for supplying oxygen and a combustible gas to said respective oxygen and combustible gas passages.

17. In a welding machine, the combination of a heating means comprising a rotatable torch support having means to conduct gases from sources of supply to gas mixers, a tapered plug mounted in said support having a centrally disposed bore therethrough with a portion at one end enlarged so as to give a flattened annular bottom to the enlargement, a member having a bore coextensive with said centrally disposed bore to secure the plug in said support and to support in turn a torch tip, a flat ended mixing nozzle spaced from the flattened bottom of said enlargement to provide an annular gas passage, said nozzle having a central oxygen bore coextensive with the bore in said plug and communicating with the annular passage, an enlarged end on said mixing nozzle fitted in said enlarged bore and traversed by a plurality of gas passages communicating with said annular passage, another enlarged portion on said nozzle having a constricted passage to admit a jet of oxygen to the central oxygen bore, and means to regulate the flow of gas and oxygen to said mixing nozzle.

18. In a welding machine, the combination of a pipe heating means comprising a rotatable torch support having means to conduct gases from sources of supply, at least one gas mixer and at least one torch on said support adapted to receive said gases, the torch having a tip with a plurality of terminal passages directed obliquely with respect to each other, the orifices of said passages being approximately diametrically disposed.

19. A support for a welding machine which comprises a frame, yokes on the frame to support aligning and conveying rollers which include roller supporting members, resilient means bearing on said support and the yoke to hold the rollers in an extended position, adjustable cam means to limit the return movement of said rollers, and means to adjust said cams.

20. A support for a welding machine in combination with a pipe alignment mechanism which comprises a frame, yokes on the frame to carry aligning and supporting rollers which include roller supporting members having lower faces inclined to the axis of the frame, internally threaded collars having external inclined plane surfaces to coact with the lower surfaces of the roller supporting members, rotatable shafts mounted in the yokes and threadably engaging said collars to propel the collars in either direction, and means to prevent circumferential and axial movement of the roller supporting members.

21. In a welding machine, the combination of a frame carrying a stationary clamp, a movable clamp, each of said clamps having movable jaws, a means for storing impact producing energy upon said movable clamp, means for producing said energy in said storing means, a fluid system for operating said jaws and said energy producing means, said system comprising at least one cylinder in each of said clamps and at least one cylinder on said frame, a piston in each of said cylinders for separately operating said jaws and said means for producing energy in said storing means, a fluid conduit between said pump and each of said cylinders, means in said conduit for releasing the fluid from said conduit.

22. A portable apparatus for fusing together the ends of pipe line sections including a member for attachment to one section of a pipe line, a clamp for attachment to another section, a separable alining frame interposed between said member and the clamp for encircling and guiding the pipe section engaged by the clamp, means extending from said member for holding the alining frame fixed relative thereto, a welding head for encircling one pipe line section and supported between said member and the alining frame for fusing the meeting ends of the pipe sections, said welding head being rotatably mounted relative to the member, and means connecting the clamp and the alining frame for feeding one of the pipe sections toward the other during the fusing operation, said feeding means having means for impacting the ends of the pipes to be welded after the ends have been raised to a welding temperature.

23. A portable apparatus for fusing together the ends of pipe line sections including a separable welding head frame for surrounding a pipe line section, means for fixedly attaching it to a pipe line section, a separable ring-like welding head mounted to slide and rotate relative to said frame, means extending from the frame for guiding it longitudinally of the pipe section during its sliding movement, a pipe alining element joined to the frame, anti-friction means therein for engagement by a movable pipe line section extending through said element, and means connected to the pipe alining element and to the movable pipe line section for shifting said movable section within the alining element and toward the welding head frame.

ANDREW F. BELL.

CERTIFICATE OF CORRECTION.

Patent No. 2,047,305.     July 14, 1936.

ANDREW F. BELL.

It is hereby certified that error appears in the printed specification of the above numbered patent requiring correction as follows: Page 8, second column, line 16, claim 23, after "frame" and before the period insert the comma and words, said shifting means having means for impacting the ends of the pipes to be welded after the ends have been raised to a welding temperature; and that the said Letters Patent should be read with this correction therein that the same may conform to the record of the case in the Patent Office.

Signed and sealed this 8th day of September, A. D. 1936.

(Seal)                                Leslie Frazer
Acting Commissioner of Patents.

the ends of pipe line sections including a member for attachment to one section of a pipe line, a clamp for attachment to another section, a separable alining frame interposed between said member and the clamp for encircling and guiding the pipe section engaged by the clamp, means extending from said member for holding the alining frame fixed relative thereto, a welding head for encircling one pipe line section and supported between said member and the alining frame for fusing the meeting ends of the pipe sections, said welding head being rotatably mounted relative to the member, and means connecting the clamp and the alining frame for feeding one of the pipe sections toward the other during the fusing operation, said feeding means having means for impacting the ends of the pipes to be welded after the ends have been raised to a welding temperature.

23. A portable apparatus for fusing together the ends of pipe line sections including a separable welding head frame for surrounding a pipe line section, means for fixedly attaching it to a pipe line section, a separable ring-like welding head mounted to slide and rotate relative to said frame, means extending from the frame for guiding it longitudinally of the pipe section during its sliding movement, a pipe alining element joined to the frame, anti-friction means therein for engagement by a movable pipe line section extending through said element, and means connected to the pipe alining element and to the movable pipe line section for shifting said movable section within the alining element and toward the welding head frame.

ANDREW F. BELL.

CERTIFICATE OF CORRECTION.

Patent No. 2,047,305.     July 14, 1936.

ANDREW F. BELL.

It is hereby certified that error appears in the printed specification of the above numbered patent requiring correction as follows: Page 8, second column, line 16, claim 23, after "frame" and before the period insert the comma and words, said shifting means having means for impacting the ends of the pipes to be welded after the ends have been raised to a welding temperature; and that the said Letters Patent should be read with this correction therein that the same may conform to the record of the case in the Patent Office.

Signed and sealed this 8th day of September, A. D. 1936.

(Seal)

Leslie Frazer
Acting Commissioner of Patents.

CERTIFICATE OF CORRECTION.

Patent No. 2,047,305.  July 14, 1936.

ANDREW F. BELL.

It is hereby certified that error appears in the printed specification of the above numbered patent requiring correction as follows: Page 8, second column, line 16, claim 23, after "frame" and before the period insert the comma and words., said shifting means having means for impacting the ends of the pipes to be welded after the ends have been raised to a welding temperature;. and that the said Letters Patent should be read with this correction therein that the same may conform to the record of the case in the Patent Office.

Signed and sealed this 8th day of September, A. D. 1936.

(Seal)

Leslie Frazer
Acting Commissioner of Patents.